(12) United States Patent
Agrusa et al.

(10) Patent No.: US 10,152,968 B1
(45) Date of Patent: Dec. 11, 2018

(54) SYSTEMS AND METHODS FOR SPEECH-BASED MONITORING AND/OR CONTROL OF AUTOMATION DEVICES

(71) Applicant: Iconics, Inc., Foxborough, MA (US)

(72) Inventors: Russell L. Agrusa, Westwood, MA (US); Vojtech Kresl, Plzen (CZ); Christopher N. Elsbree, Milford, MA (US); Marco Tagliaferri, Mansfield, MA (US); Lukas Volf, Holysov (CZ)

(73) Assignee: Iconics, Inc., Foxborough, MA (US)

( * ) Notice: Subject to any disclaimer, the term of this patent is extended or adjusted under 35 U.S.C. 154(b) by 0 days.

(21) Appl. No.: 15/194,500

(22) Filed: Jun. 27, 2016

Related U.S. Application Data

(60) Provisional application No. 62/185,340, filed on Jun. 26, 2015.

(51) Int. Cl.
| | | |
|---|---|---|
| *G10L 15/00* | (2013.01) | |
| *G10L 15/22* | (2006.01) | |
| *G10L 15/183* | (2013.01) | |
| *G06F 3/16* | (2006.01) | |
| *G10L 15/16* | (2006.01) | |

(52) U.S. Cl.
CPC .............. *G10L 15/22* (2013.01); *G06F 3/167* (2013.01); *G10L 15/183* (2013.01); *G10L 15/00* (2013.01); *G10L 15/16* (2013.01); *G10L 2015/223* (2013.01)

(58) Field of Classification Search
CPC ........................................................ G10L 15/16
USPC ........................................................ 704/232
See application file for complete search history.

(56) References Cited

U.S. PATENT DOCUMENTS

| | | | | |
|---|---|---|---|---|
| 5,317,673 A | * | 5/1994 | Cohen ................... | G10L 15/144 704/232 |
| 5,581,659 A | * | 12/1996 | Takatori ................ | G06N 3/08 706/19 |
| 6,151,574 A | * | 11/2000 | Lee ........................ | G10L 15/065 704/243 |
| 9,153,231 B1 | * | 10/2015 | Salvador ............... | G10L 15/065 |
| 9,324,321 B2 | * | 4/2016 | Xue ....................... | G10L 15/075 |
| 2004/0260538 A1 | * | 12/2004 | Morse ..................... | G10L 15/26 704/201 |
| 2005/0021337 A1 | * | 1/2005 | Kwon .................... | G10L 15/144 704/256 |
| 2010/0318412 A1 | * | 12/2010 | Karypis ................ | G06Q 30/02 705/14.1 |

(Continued)

*Primary Examiner* — Forrest F Tzeng
(74) *Attorney, Agent, or Firm* — Goodwin Procter LLP

(57) ABSTRACT

Systems and methods for speech-based monitoring and/or control of automation devices are described. A speech-based method for monitoring and/or control of automation devices may include steps of determining a type of automation device to which first speech relates based, at least in part, on a location associated with the first speech; selecting a topic-specific speech recognition model adapted to recognize speech related to the determined type of automation device; using the topic-specific speech recognition model to recognize second speech provided at the location, wherein recognizing the second speech comprises identifying a query or command relating to the type of automation device and represented by the second speech; and issuing the query or command represented by the second speech to an automation device of the determined type.

22 Claims, 3 Drawing Sheets

(56) References Cited

U.S. PATENT DOCUMENTS

| | | | |
|---|---|---|---|
| 2012/0123904 A1* | 5/2012 | Foerster | G06Q 30/0625 705/26.62 |
| 2014/0257803 A1* | 9/2014 | Yu | G06N 3/0481 704/232 |
| 2015/0039299 A1* | 2/2015 | Weinstein | G10L 15/16 704/202 |
| 2015/0127327 A1* | 5/2015 | Bacchiani | G10L 25/30 704/202 |

* cited by examiner

SYSTEMS AND METHODS FOR SPEECH-BASED MONITORING AND/OR CONTROL OF AUTOMATION DEVICES

CROSS-REFERENCE TO RELATED APPLICATIONS

This application claims priority to and the benefit of U.S. Provisional Patent Application No. 62/185,340, filed on Jun. 26, 2015 and titled "Augmented Reality Using Voice Machine Interface," which is hereby incorporated by reference herein in its entirety.

FIELD OF THE INVENTION

The present disclosure relates generally to speech recognition and, more particularly, to systems and methods for speech-based monitoring and/or control of automation devices.

BACKGROUND

Speech recognition systems generally use speech recognition models to recognize speech. For automatic dictation or speech-to-text processing applications, the recognized speech can then be converted into corresponding text. Alternatively or in addition, for natural language processing (NLP) applications, the recognized speech can be interpreted and action can be taken based thereon.

A speech recognition model generally includes an acoustic model and a language model. Acoustic models generally model the relationships between audio signals (e.g., electrical signals representing sounds) and phonemes or other linguistic units of speech. An acoustic model may be created by using audio recordings of speech and corresponding transcriptions of the speech to train a predictive model (e.g., a statistical model) to identify the linguistic units represented by audio signals. Different acoustic models may be specifically trained for use by a particular user (or group of users), or for use in a particular environment. An acoustic model that has been specifically trained for a particular user or environment may provide more accurate results, when used by that user or within that environment, than general-purpose acoustic models or acoustic models trained for different users or environments, because different speakers can use different sounds to represent the same linguistic units, and different audio channels can produce different audio signals to represent the same speech. For example, an acoustic model trained using mobile phone conversations in the Canadian dialect of the English language may provide relatively high accuracy for mobile-phone based speech in the Canadian English dialect, whereas an acoustic model trained using toll quality audio of speech in the Australian dialect of the English language may provide relatively lower accuracy for mobile-phone based speech in the Canadian English dialect.

Language models generally use deterministic (e.g., grammar-based) techniques or stochastic (e.g., statistical) techniques to estimate which word or sequence of words is represented by a segment of speech. Statistical language models generally model the probability that a portion of speech represents a particular word or sequence of words. The probability that a particular portion of speech represents a particular word may depend on the speaker's preceding words, on the position of the word within a sentence, etc. For example, in American English, the word "touchdown" (which refers to a scoring play in American football) and the phrase "touched down" (which can refer to an event during the landing of an airplane) sound almost identical, but have very different meanings. A language model may distinguish between the word "touchdown" and the phrase "touched down" based on the speaker's preceding words, because the sequences of words "scored a touchdown" and "the plane touched down" are far more likely to occur than the sequence of words "scored a touched down" and "the plane touchdown." A language model that has been specifically trained for speech relating to a particular topic may provide more accurate results, when used to model speech relating to that topic, than general-purpose language models or language models trained for different topics, because different words (or sequences of words) are more or less likely to occur in discussions of different topics. Topic-specific language models are commonly used for dictation applications relating to the practice of law or the practice of medicine, because the vocabularies and language patterns of lawyers and doctors can be highly specialized and therefore difficult to recognize using general-purpose language models.

Process monitoring and control relates to the viewing and control of parameters of one or more processes, environments in which the processes are performed, and/or the operation of equipment executing the processes. In the manufacturing context, for example, process parameters can include duration, temperature, pressure, speed, quantity, and/or direction of motion of a particular piece of machinery. In other processes (e.g., processes performed in the course of using and maintaining information systems, management systems, etc.), the parameters can include the temperature of the operating environment, throughput (transactional and/or packet-based), downtime, usage, etc. Automation, or process control, systems can be used to help manage production, monitor and maintain equipment, view performance and operational trends, and/or perform business functions such as remotely modifying operational parameters, visually inspecting equipment or operations, and scheduling maintenance.

SUMMARY

Conventional user interfaces for modern automation systems can be exceedingly complex and difficult to use. Even users who are very familiar with the processes and automation devices being monitored and controlled by an automation system can have difficulty controlling those processes and automation devices through the automation system's user interface, unless the users are also very familiar with the automation devices and their user interfaces. Furthermore, different processes and automation device may be monitored and controlled by different automation systems, which may have different user interfaces. The complexity of these user interfaces and the difficulty of mastering user interfaces for multiple automation systems and devices can impose a high cognitive burden on users, which can lead to errors in the commands issued by users to automation systems through conventional user interfaces. Such errors can have adverse impacts on the processes and automation devices being monitored and controlled, including collection of inaccurate data, decreased efficiency of monitored and controlled processes, damage to monitored and controlled devices, damage to facilitates, and injury or death of device operators and other personnel.

Thus, there is a need for a less complex, more intuitive user interface for automation systems. Speech-based user interfaces can facilitate user interaction with automation systems and therefore facilitate monitoring and control of processes and automation devices through such systems. When a speech-based user interface is used to control an automation system, it is desirable for the user interface to accurately identify (1) the command or query being issued by the user, and (2) the automation device to which the command or query applies. The inventors have recognized and appreciated that the accuracy of a speech-based user interface for automation systems can be enhanced by selecting the interface's speech recognition model based on the user's location. For example, if the user is standing at a location L near a particular automation device D when the user utters a command or query, the user interface can infer that the user intends for the command or query to apply to the automation device D, and can select a speech recognition model that has been specifically trained to recognize commands and queries applicable to automation device D or to automation devices of the same type as the device D.

Described herein are new systems and methods usable with, for example, speech-based user interfaces for automation systems. A speech recognition model may be selected based on the location of a user (e.g., based on the user's location relative to one or more automation devices. The selected speech recognition model may have been specifically trained to recognize speech (e.g., commands and/or queries) related to an automation device (or type of automation device) that is proximate the user. The selected speech recognition model may be used to recognize the speech uttered by the user and to identify a command or query represented by the user's speech. The command or query may be issued to the automation system associated with the user's location. In some cases, the user may be prompted to confirm the system's interpretation of the user's speech before the command or query is issued.

According to one aspect of the present disclosure, a method is provided, comprising: determining a type of automation device to which first speech relates based, at least in part, on a location associated with the first speech; selecting a topic-specific speech recognition model adapted to recognize speech related to the determined type of automation system; using the topic-specific speech recognition model to recognize second speech provided at the location, wherein recognizing the second speech comprises identifying a query or command relating to the type of automation device and represented by the second speech; and issuing the query or command represented by the second speech to an automation device of the determined type.

In some embodiments, the type of automation device to which the first speech relates is a first type of automation device, and determining the type of automation device to which the first speech relates based, at least in part, on the location associated with the first speech comprises: obtaining first location data representing the location associated with the first speech; providing the first location data to a search engine operable to search for a type of automation device disposed at a location proximate to the location represented by the first location data; and determining, based on results provided by the search engine, that the first type of automation device is disposed proximate to the location represented by the first location data.

In some embodiments, determining the type of automation device to which the first speech relates based, at least in part, on the location associated with the first speech comprises: obtaining first location data representing the location associated with the first speech; obtaining second location data representing one or more locations of one or more respective automation devices, wherein the one or more automation devices include a first automation device located nearest to the location associated with the first speech; based on the first location data and the second location data, identifying the first automation device located nearest to the location associated with the first speech; and determining that the type of automation device to which the first speech relates is a type of the first automation device.

In some embodiments, the type of automation device to which the first speech relates is a first type of automation device, the location associated with the first speech is the location of an acoustic sensor operable to sense the first speech, and determining the type of automation device to which the first speech relates based, at least in part, on the location associated with the first speech comprises: obtaining identification data identifying the acoustic sensor; providing the identification data to a search engine operable to search for a type of automation device associated with the acoustic sensor identified by the identification data; and determining, based on results provided by the search engine, that the first type of automation device is associated with the acoustic sensor.

In some embodiments, the type of automation device is a manufacturing type, an industrial type, an energy-production type, a water treatment type, an environmental regulation type, an automotive type, a building type, a food/beverage type, a government infrastructure type, an oil/gas type, a pharmaceutical type, a renewable energy type, a utility/energy type, or a water/wastewater type.

In some embodiments, the location associated with the first speech comprises a location of a device including an acoustic sensor operable to detect the first speech, a location from which the first speech originates, or a location of a speaker by whom the first speech is provided. In some embodiments, the acoustic sensor comprises a microphone.

In some embodiments, determining the type of process control system to which the first speech relates is performed before the first speech is uttered. In some embodiments, the type of process control system to which the first speech relates is further determined based, at least in part, on content of the first speech.

In some embodiments, the topic-specific speech recognition model includes an acoustic model and a language model, and wherein the language model is adapted to model speech related to the determined type of process control system.

According to another aspect of the present disclosure, a system is provided, comprising at least one memory for storing computer-executable instructions; and at least one processing unit for executing the instructions, wherein execution of the instructions causes the at least one processing unit to perform operations comprising: determining a type of automation device to which first speech relates based, at least in part, on a location associated with the first speech, selecting a topic-specific speech recognition model adapted to recognize speech related to the determined type of automation device, using the topic-specific speech recognition model to recognize second speech provided at the location, wherein recognizing the second speech comprises identifying a query or command relating to the type of automation device and represented by the second speech, and issuing the query or command represented by the second speech to an automation device of the determined type.

Other aspects and implementations of the above include corresponding systems and non-transitory computer-readable media. Further aspects and advantages of the invention will become apparent from the following drawings, detailed description, and claims, all of which illustrate the principles of the invention, by way of example only. The foregoing summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

A more complete appreciation of various embodiments and some attendant advantages thereof may be obtained by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described in various implementations herein are systems and methods for speech-based monitoring and/or control of an automation (process control) system, for example, a manufacturing, industrial, energy production, water treatment, environmental regulation (e.g., heating, air conditioning and/or ventilation), automotive, building, food/beverage, government infrastructure, oil/gas, pharmaceutical, renewable energy, utility/energy, or water/wastewater automation system, in which the speech recognition model used to recognize a user's speech is selected based, at least in part, on a location associated with the user's speech.

Figure 1:
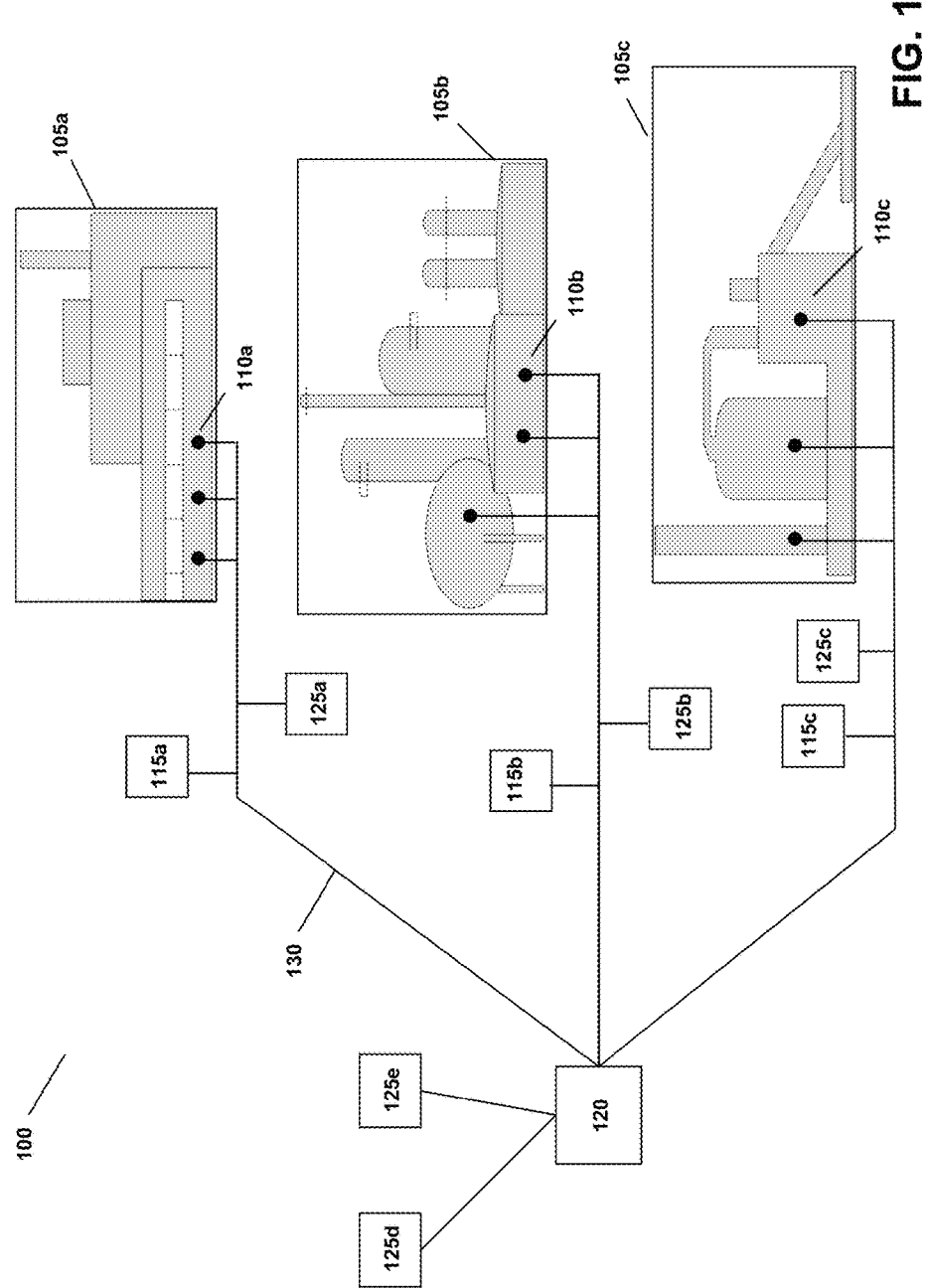
FIG. 1 depicts a general environment in which various embodiments can operate.

FIG. 1 depicts an exemplary automation system environment 100 in which a speech-based user-interface can be used for speech-based monitoring and/or control of one or more automation systems, in accordance with some embodiments. The environment 100 includes operational components that collect, analyze, present, and act on operational process control (OPC) data as it is generated and collected. The OPC data is generated and collected at or more facilities 105a, 105b and 105c (generally, 105). In this example, three facilities 105 are shown for illustrative purposes only, as there can be any number of facilities 105, which can be part of a common processing or manufacturing facility, or geographically dispersed around the globe performing vastly different operations.

To monitor individual processes and controls at each facility 105, process control equipment 110a, 110b and 110c can be installed to measure one or more processing parameters associated with the processes. For example, a gauge can be placed inside a boiler to measure the temperature and/or pressure, or an optical scanner can be placed at the location where a manufacturing step is completed to measure throughput or look for defects, and so on. In any case, the data from the individual pieces of process control equipment 110 can be collected for the entire facility and reported at a facility-specific OPC server 115a, 115b, and 115c for reporting and control purposes. The data collection and reporting may take place in real-time, asynchronously, or, in some cases, a combination of both.

In some implementations, a centralized data collection and reporting system can consolidate, aggregate and/or compare data collected from each facility 105 and the various process control devices 110 operating at each facility 105. In such cases, an enterprise OPC server 120 can communicate with the facility-specific OPC servers 115 and/or the individual controllers 110 continuously or periodically using one or more data communications services. The enterprise OPC server 120 and/or the facility-specific OPC servers 115 can in turn support client devices 125a-125e at which users can view representations of the OPC data and, in some cases, send queries and commands to the process controllers 110 that monitor and control processes and equipment at each facility 105.

Some or all of the components described above can be connected by and communicate via a network 130. The communication can take place via any media such as standard telephone lines, LAN or WAN links (e.g., T1, T3, 56 kb, X.25), broadband connections (ISDN, Frame Relay, ATM), wireless links, and so on. The network 130 can carry TCP/IP protocol communications, and any suitable data (e.g., HTTP/HTTPS requests made by web browsers; data provided to the web browsers in response to such requests; connections among the controllers 110, the facility-specific OPC servers 115, the enterprise OPC server 120 and the client devices 125; etc.) can be communicated over such TCP/IP networks. The type of network is not a limitation, however, and any suitable network can be used. Some examples of networks that can serve as the communications network 130 include a wireless or wired Ethernet-based intranet, a local or wide-area network (LAN or WAN), and/or the Internet, which can accommodate many different communications media and protocols.

Figure 2:
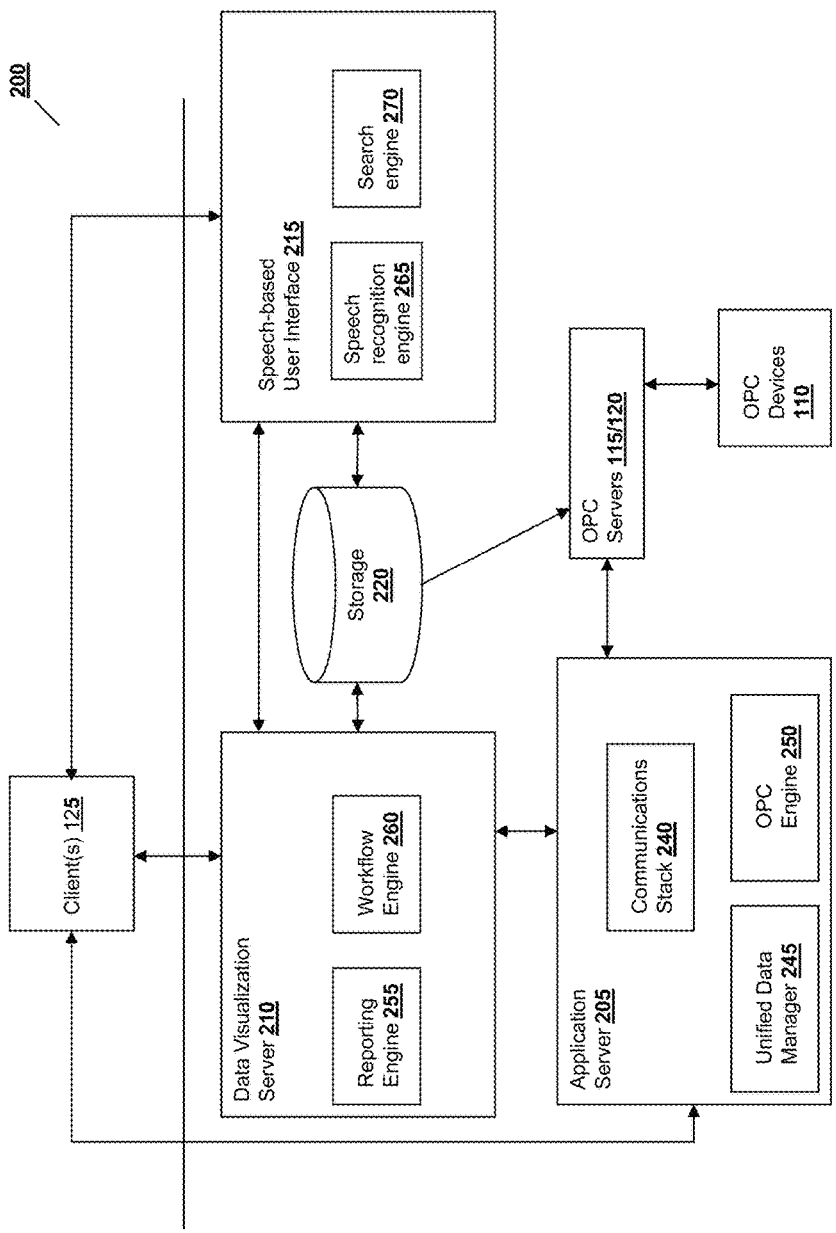
FIG. 2 depicts an example application framework according to some embodiments.

FIG. 2 illustrates an exemplary system 200 for speech-based monitoring and/or control of automation devices, according to some embodiments. Automation devices may include process controllers 110, equipment monitored and/or controlled by process controllers 110, OPC servers, and/or any other components of an automation system. In the example of FIG. 2, the system 200 includes an application server 205, a data visualization server 210, and a speech-based user interface 215, each of which can operate in concert with one or more OPC servers (115, 120) and/or process controllers 110. The system 200 can also include one or more data storage devices 220 for storing, among other things, configuration parameters associated with the OPC servers, software-based objects and other data structures that represent individual components in an automation system and their associated properties, templates that can be used by data visualization server 210 to configure automation system visualizations, speech recognition models (or portions thereof) that can be used by the speech-based user interface 215 to recognize speech (e.g., speech representing commands and/or queries for automation devices), etc. Data storage device(s) 220 can include one or more non-transitory computer-readable storage media, such as a hard disk drive, solid-state drive, random access memory, etc., and can store data in the form of a database, individual files, and so on.

In some embodiments, the storage device(s) 220 store location data indicating the locations of automation devices. The location data may represent locations using coordinates in an absolute coordinate system (e.g., latitude and longitude), coordinates in a relative coordinate system, street addresses, room numbers or other room identifiers within a facility, and/or any other information suitable for indicating a location. In some embodiments, the location data for a location may include an identifier (ID) for an automation device disposed at that location (e.g., an alphanumeric ID, a network address, etc.). In some embodiments, the location data for a location may include data indicating what type of automation device is disposed at that location. In some embodiments, the location data may be searchable by location. In some embodiments, the location data is stored in a structured format (e.g., a database, a table or array of records, etc.). In some embodiments, the location data is stored in an unstructured format (e.g., unstructured text).

The application server 205 may perform data communication, collection, aggregation and/or transformation tasks for the system 200. For example, the application server 205 may include a communication stack 240 that allows the application server 205 to send data to, request data from, and/or receive data from individual OPC servers 115, client devices 125, data visualization server 210, and speech-based user interface 215. For example, the application server 205 may use the communication stack 240 to receive commands or queries from the speech-based user interface 215, to send such commands or queries to automation devices (e.g., the process controllers 110) (e.g., via the OPC servers 115 and/or 120), and to send data representing the results of such commands or queries to the client devices 125, the data visualization server 210, and/or the speech-based user interface 215. The communications stack 240 includes a series of layered protocols for packaging and transmitting data among computers over a network. In some implementations, the communications stack provides TCP/IP-based communications among the system components to allow data to be sent using HTTP requests, XML/Web Services, and other suitable techniques.

In some embodiments, the application server 205 includes a unified data manager component 245 for manipulating data received from the various OPC servers 115. In many implementations, data is collected from processes, devices, systems, and facilities with little or no defined relationship among the data elements. For example, a shift supervisor can enter comments into an electronic log, and the comments receive timestamps and an operator ID. At the same time, OPC devices can collect processing data such as throughput (e.g., pieces/hour) and quality measurements (e.g., defects/100 pieces), all of which are measured using different units (if any) and relating to different aspects of the facility. The unified data manager component 245 can analyze the incoming data and apply a rules-based algorithm to allow the data to be reported and charted using common units.

In some implementations, the application server 205 includes an OPC engine 250 for analyzing the OPC data as it is collected (either in real-time or asynchronously) and determining whether subsequent processing, events and/or alarms are appropriate. For example, a set of rules can be defined such that the certain events (e.g., non-receipt of data, a data value outside a preferred range, etc.) warrant an alarm to be triggered and sent to a client devices 125. In some instances the OPC engine 250 formats the data for presentation on reports and charts.

The data visualization server 210 may receive data from the application server 205 and present it via an interface of the visualization server 210 and/or an interface of a client device 125. The data can be presented in various forms, including but not limited to raw tabular form, text-based reports, graphical reports, and real-time graphical representations of the monitored processes enhanced with additional data (e.g., supply-chain data, inventory data, financial data, etc.), alarms, and visual indicators relating to the processes. A reporting engine 255 may provide pre-defined report formats and graphical tool-kits that facilitate the design of custom graphs based on user and/or process-specific requirements. In some implementations, OPC data is annotated with workflow information, such as a distribution list identifying recipients (e.g., individuals, client devices, or other systems) to which the data is to be sent. In some instances, the OPC data is available in raw format according to one or more OPC standards using commonly-used data publishing techniques such as web services. In other cases, reports and/or data can be sent in-preformatted reports or as a stream of data used by a client application. In such cases, a workflow engine 260 can manage the distribution of data and/or reports according to workflow rules associated therewith.

The speech-based user interface 215 may permit users of the client device(s) 125 to issue speech-based commands and queries to automation devices, as described in further detail below. In some embodiments, the speech-based user interface includes a speech recognition engine 265 and a search engine 270. The speech recognition engine may be used to recognize speech (e.g., speech that includes queries or commands for automation devices). The search engine 270 may be used to find the identifiers and/or types of automation devices located at or near a specified location.

The speech recognition engine 265 recognizes speech represented by audio signals. In some embodiments, the speech is provided by a user in proximity to a client device 125, which converts the speech into audio signals using an acoustic sensor (e.g., a microphone) and provides the audio signals to the user interface 215. Any other suitable technique may be used to obtain audio signals representing speech.

In some embodiments, the speech recognition engine 265 uses a speech recognition model to recognize the speech represented by audio signals. The speech recognition model may be a topic-specific speech recognition model. In some embodiments, a topic-specific speech recognition model is a speech recognition model that has been adapted (e.g., trained) specifically for processing speech related to a particular topic (e.g., valid commands and queries for a particular type of automation device). In some embodiments, the speech recognition engine 265 has access to a set of topic-specific speech recognition models, each of which has been adapted to recognize speech related to a particular type of automation device. The speech recognition engine may determine which speech recognition model is used for a particular speech recognition task based, at least in part, on the location of the client device 125 that provides the audio signals representing the speech.

In some embodiments, a topic-specific speech recognition model is a speech recognition model that includes a language model that has been adapted (e.g., trained) specifically for processing speech related to a particular topic (e.g., valid commands and queries for a particular type of automation device). In some embodiments, the speech recognition engine 265 has access to a set of topic-specific language models, each of which has been adapted to recognize speech related to a particular type of automation device. The speech recognition engine may determine which language model is used for a particular speech recognition task based, at least in part, on the location of the client device 125 that provides the audio signals representing the speech.

The topic-specific speech recognition and/or language models may be stored, for example, in the storage device(s) 220. In some embodiments, the speech recognition engine 265 can retrieve a topic-specific speech recognition and/or language model for a specified type of automation device from storage device(s) 220 (e.g., by specifying the desired type of automation device in a search query provided to the storage device(s) 220).

The topic-specific speech recognition models and/or language models may be trained using any suitable technique. In some embodiments, the speech recognition model for a particular type of automation device is trained using a speech corpus which includes speech (and corresponding transcriptions) representing valid commands and queries for that type of automation device. In some embodiments, the language model for a particular type of automation device is trained using a data corpus which includes text representing valid commands and queries for that type of automation device. In some embodiments, each of the topic-specific speech recognition models and/or language models is first trained using a common training corpus (e.g., a general-purpose training corpus, a training corpus specific to automation devices in general, etc.), and then adapted for a specific type of automation device using a training corpus specific to that automation device.

Still referring to FIG. 2, the search engine 270 may be used to find the identifiers and/or types of automation devices (e.g., process controllers 110) located at or near a specified location. In some embodiments, the specified location is a location associated with a user's speech. Locations associated with a user's speech may include, for example, the location of client device 125 that senses the user's speech and converts the speech to audio signals (e.g., using a microphone), the location from which the speech originates (e.g., the location of the speaker who utters the speech), etc.

To find the identifiers and/or types of automation devices located at or near a specified location, the search engine 270 may search the location data stored in the storage device(s) 220. The technique used by the search engine 270 to search the location data may depend on the format in which the location data are stored. For example, if the location data are stored in a database, the search engine 270 may construct a query suitable for identifying records of automation devices with locations proximate to the specified location. As another example, if the location data are stored in a table, the search engine may compare the locations represented by the table entries to the specified location to determine which locations are proximate to the specified location. As another example, if the location data are stored in an unstructured format, the search engine may use the same techniques that are used by modern Internet search engines to identify locations represented by the unstructured data, and may then compare those locations to the specified location to determine which locations are proximate to the specified location.

In some embodiments, to determine whether the location of an automation device $L_{AD}$ is proximate to a specified location $L_S$, the search engine 270 (1) calculates the proximity P of the location $L_{AD}$ to the location $L_S$, and (2) determines whether the proximity P exceeds a proximity threshold T. For example, the search engine may calculate the proximity P between two locations as the distance D between the two locations, and the search engine may determine that two locations are proximate to each other if the distance D is less than a threshold distance. As another example, the search engine may calculate the proximity P between two locations as the number N of automation devices between the two locations, and the search engine may determine that two locations are proximate to each other if the number N is less than a threshold (e.g., less than one, less than two, or less than three). In embodiments in which the location data are stored in a database, the search query may specify (e.g., using one or more search parameters) how the database can determine whether an automation device location $L_{AD}$ is proximate to a specified location $L_S$.

By searching the location data, the search engine 270 may find zero, one, or more than one automation devices located proximate to the specified location. If the search engine's search results include two or more automation devices, the user interface 215 may (1) prompt the user to indicate which of the identified automation devices is the subject of the user's speech, or (2) use other criteria or tests to determine which of the identified automation devices is the subject of the user's speech. In some embodiments, the user interface 215 may select the automation device nearest to the specified location. In some embodiments, the user interface 215 may use the content of the user's speech to select one of the automation devices as the most probable subject of the user's speech. For example, if the user's speech mentions a particular type of automation device, the user interface 215 may filter the search results to include only automation device(s) of the mentioned type. Likewise, if the user's speech mentions functionality or components of an automation device, the user interface 215 may filter the search results to include only automation device(s) that can perform the mentioned functionality and/or that include the mentioned components.

Some embodiments have been described in which the data visualization server 210 receives data from the application server 205 and presents it via an interface of the visualization server 210 and/or an interface of a client device 125. In some embodiments, the speech-based user interface 215 receives data (e.g., data representing text) from the application server 205, converts the data speech (e.g., using text-to-speech processing), and presents the synthesized speech via an audio output device of the visualization server 210 and/or via an audio output device of a client device 125. In some embodiments, when the user interface 215 detects a user's speech, the system 200 may display a visual prompt on an interface of the client device 125 or present an audible prompt via an audio output device of the client device 125, to confirm that the user interface 215 recognized and/or interpreted the user's speech correctly.

For example, when a user utters a command (e.g., "Open the check valve") or query for an automation device and the speech-based user interface 215 recognizes the user's speech, the system 200 may prompt the user to confirm that the user interface 215 has recognized the user's speech correctly. In some embodiments, the system 200 may prompt the user to confirm that the user interface 215 recognized the user's speech correctly by transcribing the user's speech to text and presenting an audible or visual confirmation prompt that includes the transcription (e.g., "I think you said 'Open the check valve.' Is that correct?"). In some embodiments, the system 200 may prompt the user to confirm that the user interface 215 interpreted the user's speech correctly by identifying the command or query represented by the user's speech, identifying an automation device to which the user's command or query applies, and presenting an audible or visual confirmation prompt that specifies the command/query and the automation device to which the command/query will be issued (e.g., "I think you want to open the check valve of pump number 6A. Is that correct?").

Still referring to FIG. 2, the client device 125 may include an acoustic sensor, a positioning device, and/or a proximity module. The acoustic sensor (e.g., a microphone) may be used to sense a user's speech and to convert the speech to corresponding audio signals. The positioning device may be used to determine the location of the client device 125. Any suitable type of positioning device may be used, including, without limitation, a satellite navigation device (e.g., a global positioning satellite (GPS) receiver), an inertial navigation unit, a radio navigation device, a radar navigation device, etc. The positioning device may use any suitable technique to determine the location of the client device 125, including, without limitation, (1) triangulation, trilateration, multilateration, etc. using electromagnetic signals transmitted from satellites, mobile phone towers, beacons, etc., and/or (2) dead reckoning. In some embodiments, the positioning device determines the client device's coordinates within an absolute or relative frame of reference. In some embodiments, the positioning device identifies the region, floor, and/or room of a facility in which the client device is located.

In some embodiments, other services suitable for providing information about a location may be used, including (but not limited to) bar code recognition, QR code recognition, OCR, RFID, and NFC. In some embodiments, the location data provided using such services consists of a simple identifier (ID) which can be decoded (e.g., by the client device 125 or by a server) to determine a location and/or additional optional information.

The client device's proximity module may determine the identifiers and/or types of automation devices located proximate to the client device 125. To find the identifiers and/or types of automation devices located proximate to the client device, the proximity module may obtain location data indicating the location(s) of automation device(s) in the vicinity of the client device. Such location data may be obtained using any suitable techniques, including (but not limited to) peer-to-peer techniques. For example, automation devices may transmit (e.g., wirelessly broadcast) their locations, and the client device 125 may receive the transmitted location data. In some embodiments, the information transmitted by an automation device may include data identifying the automation device and/or its type.

In some embodiments, to determine whether an automation device location $L_{AD}$ is proximate to the location $L_C$ of the client device, the client device (1) calculates the proximity P of the location $L_{AD}$ to the location $L_C$, and (2) determines whether the proximity P exceeds a proximity threshold T. For example, the client device may calculate the proximity P between two locations as the distance D between the two locations, and may determine that the two locations are proximate to each other if the distance D is less than a threshold distance.

In some embodiments, whenever the client device 125 is within range of an automation device and is receiving a peer-to-peer transmission from the automation device, the client device considers the automation device to be proximate to the client device. For example, the client device 125 may include a radio-frequency identification (RFID) reader, and the automation devices may include RFID tags, such that the client device's RFID reader receives data from the RFID tag of an automation device when the RFID reader is proximate to (e.g., within range of) the RFID tag.

In some embodiments, some or all portions of the user interface 215 may be implemented on the client device 125. In some embodiments, some or all portions of the user interface 215 may be implemented on a server remote from the client device 125. In such embodiments, the client device 125 may send audio signals representing a user's speech and location data indicating the client device's location to the user interface 215, which may select a speech recognition model (or language model) based on the location of the client device and use the selected model to recognize the user's speech. Alternatively, the client device may send to the user interface 215 audio signals representing the user's speech and proximity data identifying one or more automation device types and/or automation devices proximate to the client device, and the user interface 215 may select a speech recognition model (or language model) based on the proximity data and use the selected model to recognize the user's speech.

The techniques described herein can be implemented in appropriate hardware and/or software. The system 200 can include, for example, clients and servers capable of running one or more commercial operating systems, for example, the Microsoft Windows® operating systems, the Apple OS X® operating systems, the Linux® operating system and other variants of UNIX® operating systems, etc. Clients (e.g., client devices 125) can include, for example, a workstation, a smart or dumb terminal, network computer, smartphone, tablet, laptop, palmtop, wireless telephone, television, information appliance, wireless device, minicomputer, mainframe computer, or other computing device, that is operated as a general purpose computer or a special purpose hardware device that can perform the tasks described herein. Generally, software executing on devices in the system 200 can be implemented on a computer including a processing unit, a system memory, and a system bus that couples various system components including the system memory to the processing unit.

The software architecture of the components of the speech-based monitoring and/or control system 200 can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework. The system 200 and associated components can be implemented as native applications, web applications, or other forms of software. In some implementations, a particular application is in the form of a web page, widget, and/or Java, JavaScript, .Net, Silverlight, Flash, and/or other applet or plug-in that is downloaded to a user device and runs in conjunction with a web browser. An application and a web browser can be part of a single client-server interface; for example, an application can be implemented as a plugin to the web browser or to another framework or operating system. Any other suitable client software architecture, including but not limited to widget frameworks and applet technology can also be employed.

Method steps of the techniques described herein can be performed by one or more programmable processors executing a computer program to perform functions of some embodiments by operating on input data and generating output. Method steps can also be performed by, and some embodiments can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. Generally, a computer includes a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Figure 3:
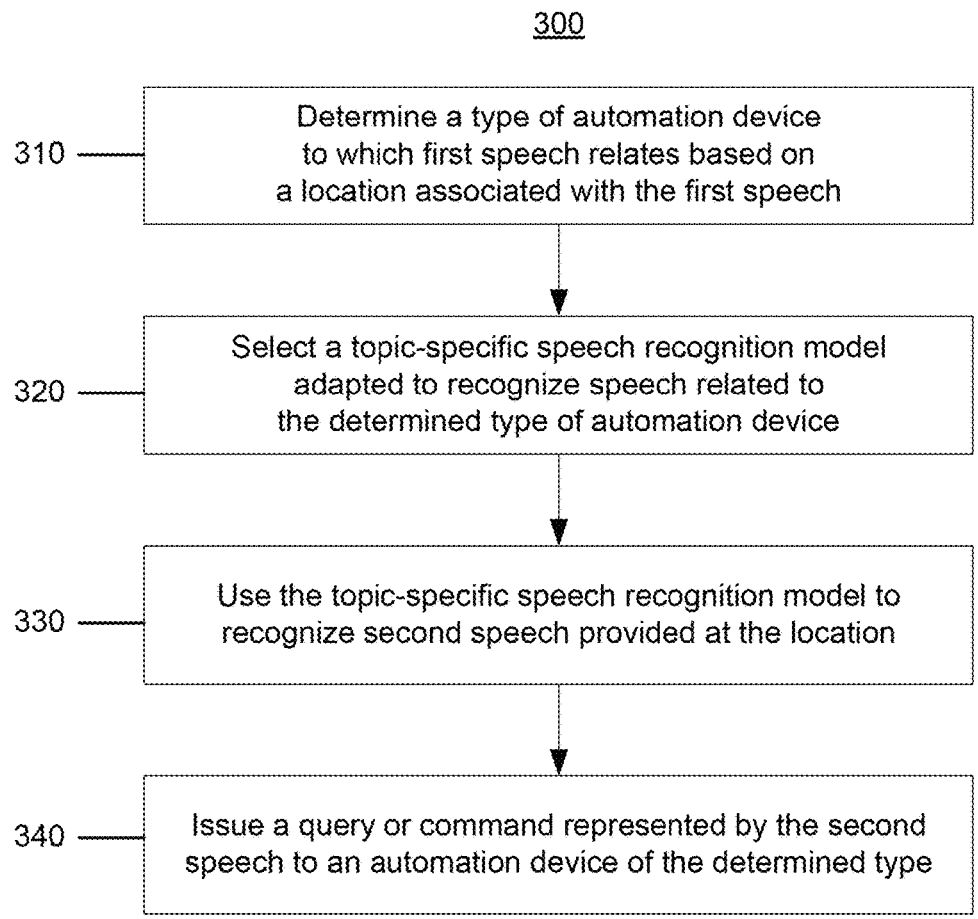
FIG. 3 depicts an example method for speech-based process monitoring and/or control, according to some embodiments.

FIG. 3 depicts a method 300 for speech-based process monitoring and/or control, according to some embodiments. In the example of FIG. 3, the method 300 includes a step 310 of determining a type of automation device to which first speech relates based, at least in part, on a location associated with the first speech; a step 320 of selecting a topic-specific speech recognition model adapted to recognize speech related to the determined type of automation device; a step 330 of using the topic-specific speech recognition model to recognize second speech provided at the location, wherein recognizing the second speech comprises identifying a query or command relating to the type of automation device and represented by the second speech; and a step 340 of issuing the query or command represented by the second speech to an automation device of the determined type. Some embodiments of the method 300 are described in further detail below.

In step 310, the system identifies a type of automation device to which first speech relates. The type of automation device is identified based, at least in part, on a location associated with the first speech. Some examples of automation device types include a manufacturing type, an industrial type, an energy-production type, a water treatment type, an environmental regulation type, an automotive type, a building type, a food/beverage type, a government infrastructure type, an oil/gas type, a pharmaceutical type, a renewable energy type, a utility/energy type, or a water/wastewater type. The location associated with the first speech may be the location of a client device 125 operable to detect the first speech, a location from which the first speech originates, a location of a speaker by whom the first speech is provided, etc. Any suitable technique may be used to identify the type of automation device to which speech relates, including, without limitation, Identification Techniques 1, 2, and 3, described below.

Identification Technique 1.

In some embodiments, identifying the type of automation device to which speech relates based on a location associated with the speech involves (1) obtaining location data representing the location $L_S$ associated with the speech, (2) searching for a type of automation device disposed at a location $L_{AD}$ proximate to the location $L_S$, and (3) determining, based on the search results, what type of automation device is located proximate to the location $L_S$.

Location data representing the location $L_S$ associated with the speech (e.g., the location of a client device 125 operable to sense the speech) may be obtained using any suitable technique, including (but not limited to) the techniques described above with reference to FIG. 2. Any suitable technique may be used to search for a type of automation device disposed at a location $L_{AD}$ proximate to the location $L_S$, including (but not limited) to the techniques described above with reference to FIG. 2 (e.g., the techniques described above with reference to the search engine 270). The search results may include zero, one, or more than one type of automation device proximate to the location $L_S$. In cases where more than one type of automation device proximate to the location $L_S$ is identified, any suitable technique may be used to determine which type of automation device is the subject of the user's speech, including (but not limited) the techniques described above with reference to FIG. 2.

Identification Technique 2.

In some embodiments, identifying the type of automation device to which speech relates based on a location associated with the speech involves (1) obtaining location data representing the location $L_S$ associated with the speech, (2) obtaining location data representing one or more locations $L_{AD}$ of one or more respective automation devices, (3) based on the location $L_S$ and the location(s) $L_{AD}$, identifying the automation device D located nearest to the location $L_S$, and (4) determining the type the automation device D.

Location data representing the location $L_S$ associated with the speech (e.g., the location of a client device 125 operable to sense the speech) may be obtained using any suitable technique, including (but not limited to) the techniques described above with reference to FIG. 2. Location data representing the location(s) $L_{AD}$ of automation device(s) may be obtained using any suitable technique, including (but not limited to) the peer-to-peer techniques described above with reference to FIG. 2. Any suitable techniques may be used to identify the automation device D and/or the type of the automation device D located nearest to the location $L_S$, including (but not limited to) the techniques described above with reference to FIG. 2.

Identification Technique 3.

In some embodiments, the system 200 for speech-based monitoring and/or control of automation devices includes acoustic sensors (e.g., microphones) co-located with the automation devices, and each acoustic sensor is operable to sense speech uttered by a speaker in proximity to the corresponding automation device. In such embodiments, identifying the type of automation device to which speech relates based on a location associated with the speech may involve (1) determining which acoustic sensor sensed the user's speech, and (2) determining which automation device and/or type of automation device corresponds to the acoustic sensor that sensed the user's speech.

Any suitable technique may be used to determine which acoustic sensor(s) sensed the user's speech, including (but not limited to) specifying a threshold speech signal strength and selecting all acoustic sensors that sense speech signals with signal strengths in excess of the threshold speech signal strength. In some embodiments, filtering techniques may be used to filter out acoustic signals corresponding to background noise (e.g., sources of sound other than the user's speech). Any suitable technique may be used to determine which automation device and/or type of automation device corresponds to an acoustic sensor. In some embodiments, data identifying the acoustic sensors, the automation devices and/or types of automation devices, and the correspondence there between may be stored in a database or a data table, either of which may be queried or searched based on data identifying an acoustic sensor.

In some cases, two or more acoustic sensors corresponding to different automation devices may sense a user's speech. In such cases, any suitable technique may be used to determine which of the automation devices is the subject of the user's speech. For example, the user may be prompted to indicate which of the identified automation devices is the subject of the user's speech, or other criteria or tests may be used to determine which of the identified automation devices is the subject of the user's speech. In some embodiments, the content of the user's speech is used to select one of the automation devices as the most probable subject of the user's speech. For example, if the user's speech mentions a particular type of automation device, the set of identified automation devices may be filtered to include only automation device(s) of the mentioned type. Likewise, if the user's speech mentions functionality or components of a particular type of automation device, the set of identified automation devices may be filtered to include only automation device(s) that can perform the mentioned functionality and/or that include the mentioned components.

Still referring to step 310, in some embodiments, the type of automation device to which the speech relates may be determined before the speech is uttered. In other words, the system 200 may identify the automation device and/or type of automation device to which a user's not-yet-uttered speech relates, even before the user utters any speech at all or without regard to any speech already uttered by the user. For example, the type of automation device to which user's not-yet-uttered speech relates may be determined based on the user's location (e.g., the location of a client device 125 carried by the user). Alternatively, in some embodiments, the type of automation device to which a user's speech relates may be determined based on a combination of the user's location and the content of the user's speech. For example, as described above with reference to FIG. 2, the content of the user's speech may be used to disambiguate or filter a set of automation devices (or automation device types) in cases where the user's location alone is not sufficient to reliably identify the automation device or type of automation device to which the user's speech relates.

Still referring to FIG. 3, the method 300 may include a step 320 of selecting a topic-specific speech recognition model adapted to recognize speech related to a particular type of automation device. Any suitable techniques for training and/or selecting the topic-specific speech recognition model may be used, including (but not limited to) the techniques described above with reference to FIG. 2. In some embodiments, selecting the topic-specific speech recognition model may involve (1) selecting a topic-specific language model adapted to model speech related to a particular type of automation device, and (2) integrating the topic-specific language model into a speech recognition model that also includes, for example, an acoustic model (e.g., a general-purpose acoustic model).

Still referring to FIG. 3, the method 300 may include a step 330 of using a topic-specific speech recognition model to recognize speech. Any suitable speech-recognition and/or natural language processing (NLP) techniques may be used.

In some embodiments, recognizing the speech includes identifying a query or command represented by the speech which relates to a type of automation device. The method 300 may also include a step 340 of issuing the query or command represented by the speech to an automation device. Any suitable automation techniques may be used to issue the query or command. In some embodiments, the query or command may be issued via an enterprise OPC server 120 or a facility-specific OPC server 115.

Some examples have been described in which topic-specific language models (e.g., statistical language models) are trained to recognize speech related to particular types of automation devices. In some embodiments, topic-specific grammar-based language models may be used. A topic-specific, grammar-based language model for a particular type of automation device may be generated based on a custom grammar that includes commands and queries that apply to the corresponding type of automation device.

Some examples have been described in which topic-specific speech recognition models or language models are selected based on a user's location, and used to recognize speech related to particular types of automation devices. In some embodiments, a custom grammar corresponding to a particular type of automation device is selected based on a user's location, and the selected custom grammar is used by a speech recognition engine to recognize speech related to the corresponding type of automation device.

Terminology

The phraseology and terminology used herein is for the purpose of description and should not be regarded as limiting.

The terms "approximately" or "substantially", the phrases "approximately equal to" or "substantially equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Equivalents

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. In addition, although various implementations have been described as having particular features and/or combinations of components, other implementations are possible having any combination or sub-combination of any features and/or components from any of the implementations described herein.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A computer-implemented method comprising:
inferring, based on data indicating locations of a plurality of automation devices and on a location associated with a user, that first speech of the user is directed to a particular automation device of a particular type, wherein the particular automation device is installed and operating at one of the indicated locations, and wherein the location of the particular automation device is proximate to the location associated with the user while the user is uttering the first speech;
selecting a topic-specific speech recognition model adapted to recognize speech related to the determined type of automation device;
using the topic-specific speech recognition model to recognize second speech provided at the location, wherein recognizing the second speech comprises identifying a query or command relating to the type of automation device and represented by the second speech; and
issuing the query or command represented by the second speech to the particular automation device of the particular type, thereby prompting the particular automation device to perform an act responsive to the command or query,
wherein the type of automation device is a manufacturing process control type, an industrial process control type, an energy-production process control type, a water treatment process control type, an environmental regulation process control type, and/or a utility process control type.

2. The method of claim 1, wherein inferring that the first speech of the user is directed to the particular automation device of the particular type comprises:
obtaining first location data representing the location associated with the user;
providing the first location data to a search engine operable to search for an automation device disposed at a location proximate to the location represented by the first location data; and
determining, based on results provided by the search engine, that the particular automation device of the particular type is disposed proximate to the location represented by the first location data.

3. The method of claim 1, wherein inferring that the first speech of the user is directed to the particular automation device of the particular type comprises:
obtaining first location data representing the location associated with the user;
obtaining second location data representing one or more locations of one or more respective automation devices, wherein the one or more automation devices include a first automation device located nearest to the location represented by the first location data; and
based on the first location data and the second location data, identifying the first automation device as the particular automation device to which the first speech is directed.

4. The method of claim 1, wherein the location associated with the user is the location of an acoustic sensor operable to sense the first speech, and wherein inferring that the first speech of the user is directed to the particular automation device of the particular type comprises:
obtaining identification data identifying the acoustic sensor;

providing the identification data to a search engine operable to search for an automation device disposed proximate to the acoustic sensor identified by the identification data; and determining, based on results provided by the search engine, that the particular automation device of the particular type is disposed proximate to the acoustic sensor.

5. The method of claim 1, wherein the location associated with the user comprises a location of a device including an acoustic sensor operable to detect the first speech, a location from which the first speech originates, or a location of the user by whom the first speech is provided.

6. The method of claim 5, wherein the acoustic sensor comprises a microphone.

7. The method of claim 1, wherein inferring the particular automation device to which the first speech is directed is performed before the first speech is uttered.

8. The method of claim 1, wherein the particular automation device to which the first speech is directed is further inferred based, at least in part, on content of the first speech.

9. The method of claim 1, wherein the topic-specific speech recognition model includes an acoustic model and a language model, and wherein the language model is adapted to model speech related to the particular type of the particular automation device.

10. A system comprising:
at least one memory for storing computer-executable instructions; and
at least one processing unit for executing the instructions, wherein execution of the instructions causes the at least one processing unit to perform operations comprising:
inferring, based on data indicating locations of a plurality of automation devices and on a location associated with a user, that first speech of the user is directed to a particular automation device of a particular type, wherein the particular automation device is installed and operating at one of the indicated locations, and wherein the location of the particular automation device is proximate to the location associated with the user while the user is uttering the first speech;
selecting a topic-specific speech recognition model adapted to recognize speech related to the determined type of automation device,
using the topic-specific speech recognition model to recognize second speech provided at the location, wherein recognizing the second speech comprises identifying a query or command relating to the type of automation device and represented by the second speech, and
issuing the query or command represented by the second speech to the particular automation device of the particular type, thereby prompting the particular automation device to perform an act responsive to the command or query,
wherein the type of automation device is a manufacturing process control type, an industrial process control type, an energy-production process control type, a water treatment process control type, an environmental regulation process control type, and/or a utility process control type.

11. The system of claim 10, wherein inferring that the first speech of the user is directed to the particular automation device of the particular type comprises:
obtaining first location data representing the location associated with the user;

providing the first location data to a search engine operable to search for an automation device disposed at a location proximate to the location represented by the first location data; and determining, based on results provided by the search engine, that the particular automation device of the particular type is disposed proximate to the location represented by the first location data.

12. The system of claim 10, wherein inferring that the first speech of the user is directed to the particular automation device of the particular type comprises:
obtaining first location data representing the location associated with the user;
obtaining second location data representing one or more locations of one or more respective automation devices, wherein the one or more automation devices include a first automation device located nearest to the location represented by the first location data; and
based on the first location data and the second location data, identifying the first automation device as the particular automation device to which the first speech is directed.

13. The system of claim 10, wherein the location associated with the user is the location of an acoustic sensor operable to sense the first speech, and wherein inferring that the first speech of the user is directed to the particular automation device of the particular type comprises:
obtaining identification data identifying the acoustic sensor;
providing the identification data to a search engine operable to search for an automation device disposed proximate to the acoustic sensor identified by the identification data; and
determining, based on results provided by the search engine, that the particular automation device of the particular type is disposed proximate to the acoustic sensor.

14. The system of claim 10, further comprising an acoustic sensor operable to detect speech, wherein the system is a mobile device, and wherein the location associated with the user is a location of the mobile device.

15. The system of claim 14, wherein the acoustic sensor comprises a microphone.

16. The system of claim 10, wherein inferring the particular automation device to which the first speech is directed is performed before the first speech is uttered.

17. The system of claim 10, wherein the particular automation device to which the first speech is directed is further inferred based, at least in part, on content of the first speech.

18. The method of claim 1, wherein the topic-specific speech recognition model includes an acoustic model and a language model, and wherein the language model is adapted to model speech related to the particular type of the particular automation device.

19. The method of claim 1, wherein issuing the query or command to the particular automation device comprises sending the query or command to a process controller associated with the particular automation device, and wherein prompting the particular automation device to perform an act responsive to the command or query comprises prompting the process controller to control the particular automation device to perform an act responsive to the command or query.

20. The method of claim 1, wherein the plurality of automation devices includes two or more proximate automation devices installed and operating at locations proximate to the location associated with the user, and wherein inferring that first speech of the user is directed to the particular automation device includes:
- inferring, independent of content of the second speech, that the first speech is directed to an unknown one of the two or more proximate automation devices; and
- based on the content of the first speech, selecting, from the two or more proximate automation devices, the particular automation device to which the first speech is directed.

21. The method of claim 1, further comprising:
prior to issuing the query or command to the particular automation device, prompting a user to confirm the query or command and an identity of the particular automation device, wherein prompting the user includes presenting a confirmation prompt specifying the query or command and the particular automation device to which the query or command will be issued.

22. The method of claim 1, wherein the first speech comprises the second speech.

\* \* \* \* \*